US012810289B2

(12) United States Patent
McEntee et al.

(10) Patent No.: US 12,810,289 B2
(45) **Date of Patent: *Nov. 24, 2026**

(54) SYSTEMS AND METHODS FOR IMPROVING DATA PROCESSING AND MANAGEMENT

(71) Applicant: Intercontinental Exchange Holdings, Inc., Atlanta, GA (US)

(72) Inventors: Christopher McEntee, Atlanta, GA (US); Brenda B. Clem, Cincinnati, OH (US); Joseph Michalowski, Western Springs, IL (US); Robyn Piatt, Moss Point, MS (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/456,559

(22) Filed: Jan. 22, 2026

(65) Prior Publication Data

US 2026/0154677 A1 Jun. 4, 2026

Related U.S. Application Data

(63) Continuation of application No. 14/680,391, filed on Apr. 7, 2015, now Pat. No. 12,561,676.

(Continued)

(51) Int. Cl.
*G06Q 20/38* (2012.01)
*G06F 16/13* (2019.01)

(Continued)

(52) U.S. Cl.
CPC ......... *G06Q 20/3825* (2013.01); *G06F 16/13* (2019.01); *G06F 16/83* (2019.01); *G06Q 40/04* (2013.01)

(58) Field of Classification Search
None
See application file for complete search history.

(56) References Cited

U.S. PATENT DOCUMENTS

| | | | | |
|---|---|---|---|---|
| 4,700,297 A | 10/1987 | Hagel, Sr. et al. | | |
| 7,818,657 B1 * | 10/2010 | Trimble | ................ | G06Q 40/02 715/255 |

(Continued)

FOREIGN PATENT DOCUMENTS

| | | |
|---|---|---|
| CN | 101997643 A | 3/2011 |
| EP | 1760581 A1 | 3/2007 |

OTHER PUBLICATIONS

Chanod et al., "From Legacy Documents to XML: A Conversion Framework", Research and Advanced Technology for Digital Libraries, ECDL 2005 (pp. 92-103) (Year: 2005).

(Continued)

*Primary Examiner* — Arunava Chakravarti
(74) *Attorney, Agent, or Firm* — DLA Piper LLP

(57) ABSTRACT

Systems and methods for data management via a data management system are provided. The data management system can receive data relating to one or more assets, the data in one or more formats, convert the asset data to a uniform format, extract data elements, compare and normalize the data elements against a standard reference database, and automatically validate the one or more data elements. The validation can be performed by comparing data elements to requirements set by the data management system or other party, and confirming that the data elements match the requirements. The validation can operate to initiate an asset transaction.

13 Claims, 9 Drawing Sheets

Related U.S. Application Data

(60) Provisional application No. 61/976,153, filed on Apr. 7, 2014.

(51) Int. Cl.

| | |
|---|---|
| ***G06F 16/83*** | (2019.01) |
| ***G06Q 40/04*** | (2012.01) |

(56) References Cited

U.S. PATENT DOCUMENTS

| | | | | |
|---|---|---|---|---|
| 7,822,690 | B2 | 10/2010 | Rakowicz et al. | |
| 8,176,004 | B2 | 5/2012 | Malaney et al. | |
| 2004/0117358 | A1 | 6/2004 | von Kaenel et al. | |
| 2005/0131825 | A1 | 6/2005 | Vijay | |
| 2006/0143195 | A1 | 6/2006 | Ornstein et al. | |
| 2008/0282355 | A1 | 11/2008 | Nemazi et al. | |
| 2009/0198651 | A1 | 8/2009 | Shiffer et al. | |
| 2009/0198689 | A1 | 8/2009 | Frazier et al. | |
| 2009/0288078 | A1 | 11/2009 | Makonahalli et al. | |
| 2010/0114995 | A1 * | 5/2010 | Kopp | G06F 40/226 707/811 |
| 2012/0143748 | A1 | 6/2012 | Hu et al. | |
| 2014/0032478 | A1 | 1/2014 | Mcafee | |
| 2014/0039970 | A1 | 2/2014 | Faridy et al. | |
| 2014/0074501 | A1 | 3/2014 | Udani | |
| 2014/0114709 | A1 | 4/2014 | Olsen et al. | |
| 2014/0114818 | A1 | 4/2014 | Olsen et al. | |
| 2014/0358791 | A1 | 12/2014 | Antao et al. | |
| 2015/0073989 | A1 | 3/2015 | Green et al. | |

OTHER PUBLICATIONS

Injey et al., Using XML on z/OS and OS/390 for Application Integration, IBM Redbooks, 2001 (Year: 2001).

W3C, XML Schema Part 1: Structures Second Edition, Oct. 2004, WC3.org (Year: 2004).

* cited by examiner

SYSTEMS AND METHODS FOR IMPROVING DATA PROCESSING AND MANAGEMENT

TECHNICAL FIELD

Embodiments of the disclosure relate generally to systems and methods of data management, and more specifically to improving data processing and management.

BACKGROUND

Problems exist in the field of electronic data management where data may be received from various different sources and in various different formats. Problems include, for example, an inability to effectively and accurately process, validate, and communicate data between and among various sources or parties particularly when, for example, the data received is in various formats, structures and/or configurations. For example, a sender of data in a first format may not be able to accurately and timely provide information to a recipient if the sender and recipient are configured to process, transmit and/or receive different types of data. The data may have different formats or the data may be configured or arranged according to different standards. In one exemplary context, these and other problems are seen in electronic asset transaction processes such as, for example, in connection with mortgage note clearing and settlement transactions. In this context, counterparties, including lenders, investors, warehouse lenders, other financial institutions, and public recording offices may not be able to effectively and accurately transfer mortgage loan and related information data among the parties when one or more of the parties are configured to process, receive and/or send data in different formats and/or according to different standards. As a result, the data/information must undergo additional processing before it can be utilized by a receiving party, thereby increasing costs, time and computer resources.

Accordingly, there is a need for systems and methods of data processing and management that solve these and other problems by, (among other things), providing for the translation and/or normalization of data and information having varying structures and/or formats, as well as providing for data accuracy, quality, conformity, and integrity of the data and its processing.

SUMMARY

The present disclosure relates to systems and methods for data processing and management including, for example, in connection with data processing of asset based transactions via a data management system, the systems configured to, and methods comprising: receiving data relating to one or more assets, the asset data comprising one or more formats, converting the asset data comprising one or more formats to asset data comprising a uniform format, extracting one or more data elements from the asset data comprising a uniform format, comparing and normalizing the one or more data elements against a standard reference database. The systems and methods may also comprise automatically validating the one or more data elements, wherein the validating comprises comparing the one or more data elements to one or more requirements set by one or more of the data management system or other party, and confirming that the one or more data elements match the one or more requirements, wherein the automatic validation operates to initiate an asset transaction.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
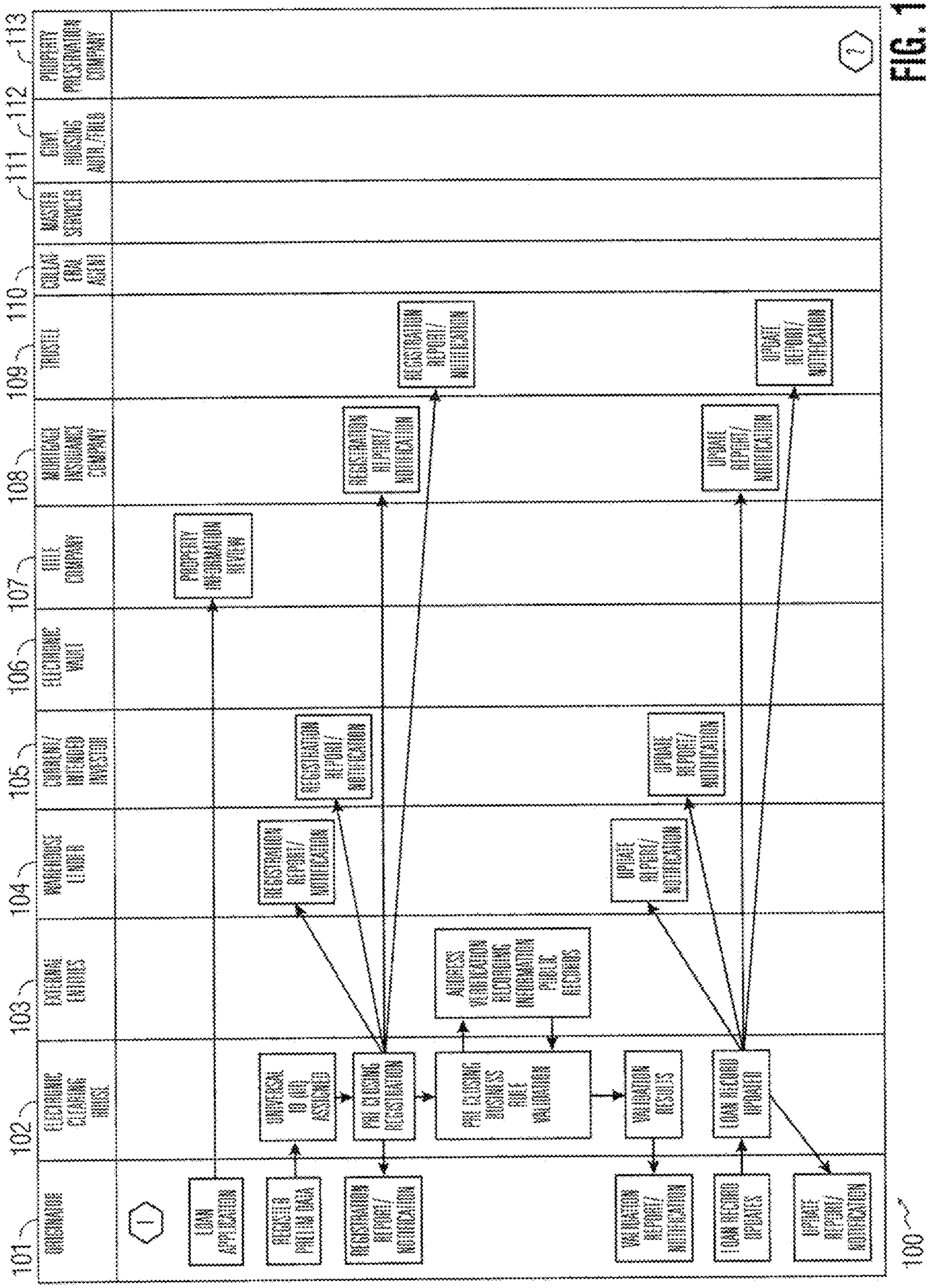
FIG. 1 is a flow diagram illustrating a data management system and method configured for performing loan note origination processes and pre-closing registration, according to an exemplary embodiment of the present disclosure.

Embodiments of the disclosure provide systems, methods and apparatus for data management and processing including, for example, in connection with the management and processing of asset transaction data involving multiple data sources.

In one exemplary embodiment, the present disclosure establishes central data management functionality that permits counterparties, operating with different data sources and different data sets in the purchasing and sale of assets, to register, assign, control, settle and transfer data and information to effect the transfer of ownership rights of assets, including (for example) electronic promissory notes, as well as the transfer of supporting documentation and information associated with the assets, as part of a secondary asset market offering. The functionality may take place within a data management system that may manage and control several unique and discrete aspects of the transaction process and to ensure ownerships rights to an asset are valid prior to initiating the transfer of the asset and asset note and/or funds between counterparties. The data management system may ensure the data accuracy, quality, conformity and integrity of the asset by validating key data elements through cross-reference, analysis, comparison and matching against proprietary, third party or public records databases, and proprietary business rules, as well as counterparty and product grading systems. As part of the process, the data management system can assign a unique asset identifier to asset files and notes through an algorithm to ensure data security and to eliminate the possible re-use of the unique asset identifier. The data management system can also assign unique counterparty identifiers or organization IDs ("OID") to customers, institutions, and/or organizations that interact with the system. The data management system can also produce, present, and track auditable event-driven messages in cooperation with third-party networks or vendor systems to ensure that public recording and fee payments associated with asset records are captured as part of an integrated process workflow. These messages and validation of an underlying asset file or note content may serve as triggers and/or prompts that can initiate interactions such as, for example, the transfer of funds between counterparties and/or their custodian financial institutions (e.g., banks). The data management system may also be configured to receive data from asset-servicing companies, normalize it to an standardized data set (e.g., transform received data into a standardized format), and present it to various parties such as, for example, investors, in reports and disclosures when specific asset lifecycle events occur or trustees which may disclose it to investors through reports. Once transactions are completed, the data management system can store historical audit records of individual transactions and update the asset records on a continual basis as lifecycle events (e.g. default, paid-in-full) occur that affect the dataset that represents the assets and characterizes its performance.

An exemplary data management system according to this disclosure may use open data standards, a proprietary data standard or a data standard developed by an independent third-party to receive data in a uniform extensible mark-up language (XML) format or similar data schema that can be automatically validated, tested, and matched against specific business rules, triggering a series of subsequent event-driven processes that can effect transfer of ownership interest in an asset, including (for example) the movement of funds from one party to another. The XML may classify and describe in a generic manner the nature of the specific data that is embedded or entered into an asset file or note. The data management system may further be configured to automatically and securely recognize and extract certain data elements from an asset file and note and analyze, match, and compare data elements against other verifiable sources to ensure accuracy and validity.

In an embodiment, the data management system may effect the purchase of a promissory asset note (for example, from a seller in a primary market) in exchange for payments that reflect the market value of the note, and the data management system may in turn sell the note to a purchasing party (for example, a purchaser in a secondary market, or an investor), in exchange for cash payments commensurate with the market value of the note (or with any other value or valuation). During the time period it takes to calculate, net values, and release cash payments against the note delivered into the data management system, the data management system may hold margin or a collateral reserve in a counterparty's account based on characteristics of the asset, for example (without limitation), the time period between sale and cash settlement, type of asset product being delivered into the data management system, the value of any underlying collateral or property, risk of credit default represented by either counterparty to the transaction, historical performance of asset product that the counterparty has delivered into the data management system, and/or value of the note that will be processed. The data management system may assess these values and risks by extracting specific data elements from the documents that comprise the asset file and note, normalizing the data against a standard reference data base (e.g., transform the data into a standardized format), and then analyzing and comparing the data elements to ensure they match the requirements of the data management system or other counterparties. The data management system may be configured to compare the above referenced data elements to historical records to develop time series and trend reports and/or to populate forecasts or risk management models. While the asset file and the note are held by the data management system, the documents may reside in a separate and secure electronic vault, or e-Vault, under the control of the data management system as buyer to every seller and seller to every buyer. In an embodiment, the received asset data associated with one particular asset may be stored as an individual data record separate from other individual data records (e.g., individual data records associated with another particular asset).

In an embodiment, the data management system may also act as central counterparty between any number (e.g., three or more) participants in the sale of an asset, for example, in a secondary market. While the data management system may act as counterparty to secondary market selling and investing parties, it may on occasion send and receive payments from other third parties, (e.g., warehouse lenders or other financial institutions), advancing funds to settlement agents functioning on behalf of the selling party or asset originator. In this case, the data management system may function as an agent, for example, on behalf of the third party, or as a principal to the transaction. If the third party obtains a security interest in the asset being originated, the data management system may assume or be assigned that security interest and maintain ownership and control of the asset after the third party acknowledges and confirms that the originator and the settlement agent has adequately closed the asset sale based on data represented in the asset package and validated by the data management system.

The data management system may choose to receive payments from the third party in exchange for control of the asset note and act as an intermediary between the selling/investing parties and the third party. Depending on circumstances and business requirements, the data management system may maintain control and retain the beneficial ownership rights of the promissory note while payments and confirmations are in process. During this period, the data management system may analyze, normalize and reconcile underlying data inputs and other asset values, validate the electronic signature associated with the asset file and/or note and match these values against those requirements provided by the purchasing party. Once the match is complete, the data management system may initiate an automated data analysis of the asset to ensure it meets one or more requirements and guidelines of the investing party. If the data management system confirms the data attributes of the assets meets those required by the investing party, payments may be exchanged between the investing party and the data management system even as the asset is released and transferred to one of these counterparties.

In each of these cases, funds in the form of wire transfers may be released via an electronic payment system to the appropriate counterparty once the data management system affirms the accuracy, timeliness and data integrity of the asset file and note data as a result of its analysis against public records, proprietary or open-source databases, or trusted third-party vendors. The data management system may reserve the right to withhold the payment when asset files and/or notes are delivered with inadequate or unclear routing instructions, when the values within the asset files and notes do not match pre-determined values submitted by the investing party, when counterparties do not abide by data management system rules, or under any other circumstances deemed appropriate. Once the investing party receives the asset file and note and the data management system accepts the cash payment, the data management system may release margin or collateral held in escrow and reimburse either the third party or the selling party.

According to an exemplary embodiment of the present disclosure, components of a data management system and method may include (without limitation) one or more of the following, as well as other features and functions:

- an electronic registry that can assign a series of unique data elements to an individual asset file and note as well as its component parts; assignment of these unique identifications ("UIs") can also be delegated to vendors that are approved and certified through an audit process by the registry's governing body; the electronic registry can store the historical records associated with these unique identifiers;
- an electronic asset file that can comprise (without limitation) a final asset application, closing document, appraisal, compliance disclosures, closing instructions, and a uniform collateral description;
- an electronic note, or eNote, that can be a legal security instrument and may represent the ownerships rights associated with a specific asset, and is viewed and accepted as the authoritative electronic version;
- a database that can store information related to the asset file and note as well as meta-data describing the attributes of records within the database; the database can encrypt any non-public, personal identifiable information;
- a data custodian that can manage a database and may be performed by a data management system according to this disclosure;
- an application programming interface, or API, that enables data to be exchanged securely between the registry, a data management system and the counterparties that interact with the electronic registry and/or data management system; the API may include specific routing instructions to ensure data is delivered to the correct location;
- a meta-data package that includes data elements used to describe the contents of an electronic asset file and an electronic note; the meta-data package, or data string, may include (without limitation) one or more of the following (and/or additional/alternative data elements (s)):
  - i) a data element that identifies a unique asset;
  - ii) a data element that identifies a unique counterparty, (e.g., an entity that originated the asset or an investor who is purchasing it);
  - iii) a data element that identifies an individual that created and originated the asset file;
  - iv) a data element that identifies a third party (e.g., a warehouse lender) that may rely on the asset file and/or note as collateral (e.g., for its lending activity);
  - v) a data element that identifies the date and time-stamp of when the asset file was submitted;
  - vi) a data element that identifies property that serves as collateral for the asset;
  - vii) a data element that identifies the sender and recipient of asset files, note, messages, and funds; and
  - viii) a data element that references a pre-defined, standardized set of lifecycle events that materially alters the data string;
- an algorithmic, biometric or holographic element that can, in conjunction with the date and time stamp, produce and/or create a unique, verifiable tamper-evident digital signature. The tamper evident digital signature may ensure the integrity and security of the data contained within the document, and that no subsequent changes to the document have occurred. Once the asset is registered with the data management system, the tamper evident digital signature of the eNote may be validated against the value contained in the data management system to ensure transaction security;
- a series of software code that apply a set of logical business rules that can normalize disparate datasets to a standard dataset (e.g., transform disparate datasets into an industry standardized data set) and can validate values extracted from an electronic asset file and electronic note. Business rules may be pre-defined by an investing party and/or a third party and the investing party may choose to use a set of business rules created by an industry trade group or third-party vendor. Business rules may apply a set of compliance tests against the dataset to ensure various local, state and federal rules and regulations are satisfied by data within the underlying asset package. The data management system may optionally rely on these rules to determine if an asset is eligible for delivery to a specific counterparty because it matches the counterparty's requirements for receipt;
- a middleware software system and\or network of integrated computer systems in which messages sent and received by counterparties submitted to the registry may remain suspended in process in a persistent state, while registry maintenance or performance issues are resolved (or for some other period of time);
- an electronic messaging system that can produce specific, event-driven messages containing instructions to systems and users it interacts with;
- an electronic public records recording network or third-party asset records filing or delivery system or service; and
- an electronic system that may include and/or perform one or more of the various functions, features, software, algorithms, data, communications, components, apparatus, process steps, etc. described herein. An exemplary electronic system according to this disclosure may comprise (without limitation) one or more computer devices, each comprising a processor configured to execute computer-readable instructions. When executed, the computer-readable instructions may cause the electronic system to perform any or all of the methods, processes, functions and/or operations described herein. The electronic system may optionally comprise one single, co-located system components, or it may comprise multiple independent sub-systems, at various locations, coupled and configured to operate together. For systems including multiple computing devices, the computing devices may be configured to communicate with each other via a wired and/or wireless network. For purposes of this disclosure, a computer device may include (without limitation) a computer terminal, a server, a mobile communication device, a desktop computer, a smart phone, a PDA (personal data assistant), a mobile computer, a tablet computer, or any other such device configured to perform one or more of the functions or operations described herein.

In an embodiment of the present disclosure, a data management system may receive (e.g., from an asset originator, broker, investors, settlement agent or any other party or source), through an electronic network, application programming interface, web service, electronic system, and/or any other suitable means, a series of structured XML data strings and/or batch files that were inputted into the electronic asset file during one or more application, origination or other process(es). These data strings may be created as they are automatically extracted from, for example, a MISMO (Mortgage Industry Standards Maintenance Organization) Smart Document standard (V.3 or later version) application file in which they are embedded and/or entered into the asset file by a user through an interactive data form as part of an XML schema. Notably, other application files according to other standards may also be utilized. These data strings may identify values of the asset file inputs and represent and describe the underlying characteristics of the asset file and note that is being transacted against between a selling party (e.g., an asset originator) and an investing party. The data string may include information about the electronic asset and electronic note and may act as a form of asset collateral for the selling party, the investing party, and/or the third party.

The XML data string may represent an array of values that detail asset characteristics, for example, (without limitation), borrower and property information, credit scores of one or more parties, and appraisal value of the asset. The data string may conform to an industry standard created by a party or an industry standard body. The data string may also contain alpha-numeric values as well as a tamper-proof, encrypted electronic signature that was executed by the first party thorough a graphic user interface or electronic signature pad, and affirmed by one or more parties (e.g., selling party, settlement agent, investing party, and/or the third party). The data management system may optionally assign a unique identifier for each transaction (e.g., one or more unique asset identifiers to asset data received from one or more sources) as well as assign a unique counterparty ID, or organization ID, for each counterparty to a transaction (e.g., one or more unique party identifiers to one or more data sources communicating with the data management system).

When a first party (e.g., a selling party) delivers an electronic asset file and electronic note into the data management system (e.g., through a web service, third-party vendor platform, or network), the data management system may extract data and information from the file and note, and analyze and attempt to match the values extracted from the file and note against a set of business rules to determine if the asset file and note contents match the content required by a second party (e.g., an investing party). As part of this analysis, the data management system may draw from multiple data sources, both internal and external, to test the validity of the asset file and note for compliance with regulations as well as accuracy. This exercise may include aligning and comparing multiple datasets against public records, business rules, product specifications, and/or second party guidelines and requirements. To ensure the data meets standards for interoperability, the data management system may automatically normalize (e.g., translate, transform, and/or convert) proprietary datasets to a predefined standard (e.g., an industry standard), proprietary standard or any other uniform data standard. In this manner, all parties and entities involved are relieved from having to translate or standardize their particular data or the data of another party, thereby relieving their respective systems from unnecessary and duplicative data processing.

In an exemplary embodiment of the present disclosure, the data management system may be used for mortgage loan note clearing and settlement functions. FIGS. 1 to 8 illustrate a data management system and method for performing various secondary market mortgage loan note clearing and settlement processes, according to an exemplary embodiment of the present disclosure. However, it should be noted that the data management systems and methods of the present disclosure may be used in various other (non-limiting) implementations involving various data sources and structures that need to effectively and efficiently communicate with each other. Indeed, the present disclosure provides a centralized and streamlined data transformation and processing mechanism that relieves the various data sources from having to perform their own added (duplicative) processing and reconfiguring in order to effectively transfer, receive and process data from each other.

Turning now to FIG. 1, FIG. 1 is a flow diagram illustrating an exemplary data management system and method 100 for performing loan note origination processes, according to an exemplary embodiment of the present disclosure. The data management system may be an electronic clearing house 102 that may permit counterparties in the purchasing an sale of mortgage loans to register, assign, control, and transfer ownership rights of an electronic note, as well as the electronic note itself along with supporting documentation, such as the mortgage loan, or credit file, as part of a secondary mortgage market offering, after an originator 101 has received a loan application and it has been approved for credit underwriting. When a loan application is initiated by a loan originator 101, the originator 101's loan origination system and/or data warehouse may send a message to the electronic registry that resides within the electronic clearing house 102 with a request to receive a universal identifier, or UI. That message may include a meta-data package that briefly describes the electronic loan file and electronic note that is undergoing production. This meta-data package may include information about the loan application, such as the borrower's name, the loan originator 101, time and date of application, and the loan product that is being offered to the borrower. It may also include data about the originating institution, including its unique organization ID, as well as the individual loan originator 101 or any other desired information and data. The registry may automatically review and analyze contents of the meta-data package to determine if its contents meet the clearing house 102 delivery standards and eligibility requirements, and then respond back to the originator 101 through its loan origination system or via a third-party network. The delivery standards may comprise mortgage trade association open data standards (e.g, MISMO standards), or other third party standards to receive data in a uniform extensible mark-up language (XML) format or similar data schema that can classify and describe the nature of the specific data, for example (without limitation), the mortgage application and loan closing disclosure, by a consumer, loan originator, or third party service, the loan's amount in relationship to the value of the property (LTV), combined loan-to-value (CLTV), credit scores of the borrower, and appraisal value of the property.

In an embodiment, the electronic clearing house 102 may automatically normalize (e.g., translate, transform, and/or convert) the received data to predefined standards and/or requirements. If the originator 101's submission meets the clearing house 102 standards and requirements, the clearing house 102 may respond with an electronic message that includes a set of variables that may be sent to the loan origination system and/or a data warehouse. These data variables may persist embedded within the electronic loan file and note. They may become part of a permanent meta-data package for the loan file and note once it is underwritten, closed and sold to an end investor 105.

The loan origination system may confirm receipt of this message or display a message from the clearing house 102 that the loan has received preliminary validation based on a test of the loan application's data. In the event the originator 101 is using a warehouse line of credit to fund the loan, a message may also be sent (e.g., simultaneously or at any desired time) to the warehouse lender 104 informing them that a draw on their credit may be occurring within the loan production cycle.

Additional messages may also be sent from the clearing house 102 to one or more associated members 108-113, which are third-party entities, such as service providers, appraisers, or quality-control firms that the originator and/or investor permit to view or transact on its behalf. The content of the message may notify the associated members 108-113 that there is potential for a loan to be produced and services may be scheduled to support production.

The loan originator 101 may continue to submit data into its loan origination system and/or data warehouse as the application and credit underwriting process continues. Periodically, throughout the process, an automated stream of the meta-data package(s) in the form of electronic messages may be sent to the clearing house 102 where it may be captured, compared with previous versions of the file, and stored.

Figure 1A:
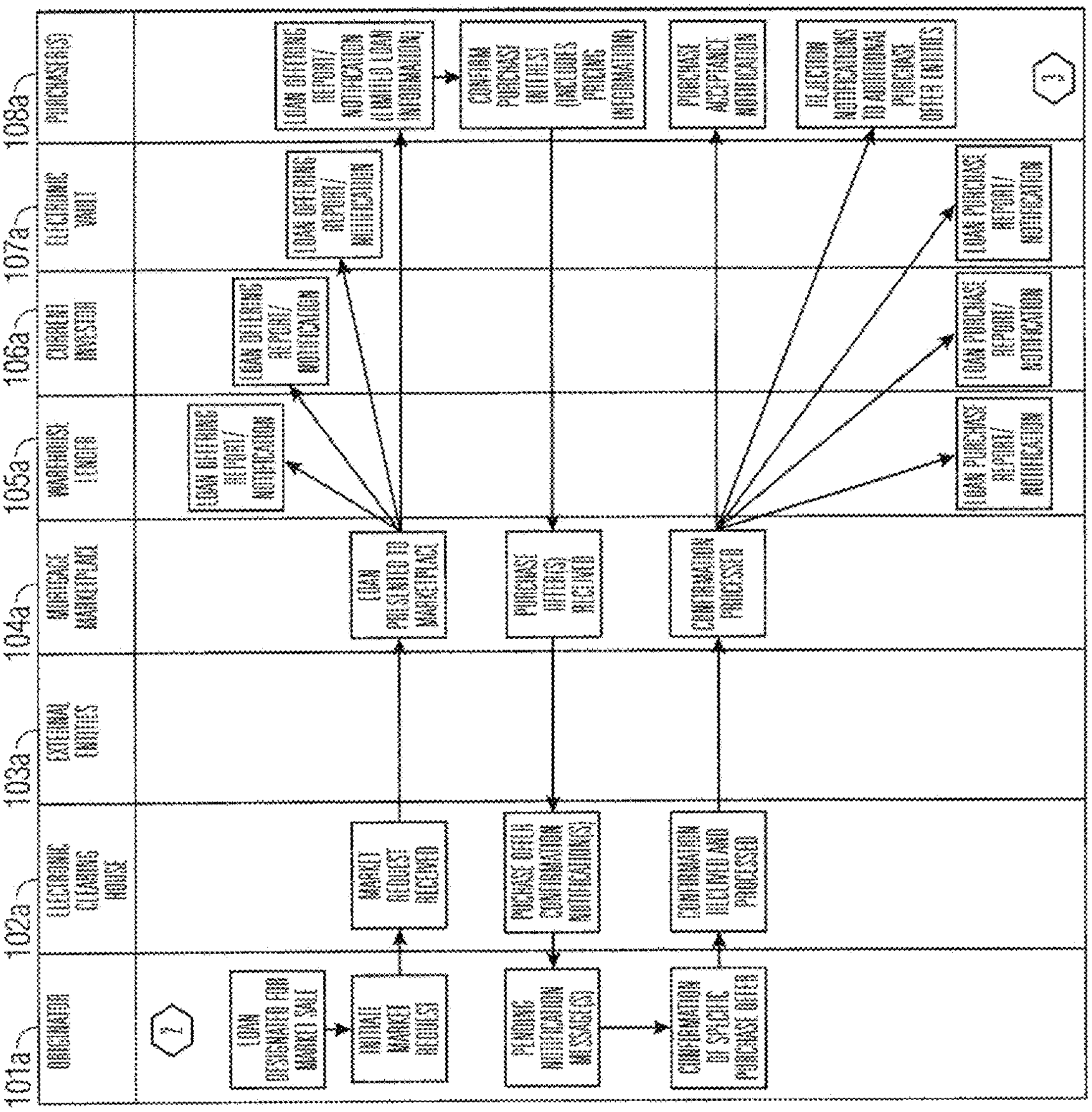
FIG. 1*a* is flow diagram illustrating a data management system and method configured for performing new marketplace sale processes, including presentation of a loan on a mortgage marketplace for bid purchase, according to an exemplary embodiment of the present disclosure.

Turning now to FIG. 1*a*, FIG. 1*a* is flow diagram illustrating a data management system and method configured for performing new marketplace sale processes, including presentation of a loan on a mortgage marketplace for bid and/or purchase, according to an exemplary embodiment of the present disclosure. Originator 101*a* may present a loan on a mortgage marketplace 104*a* for bid and/or purchase by purchasers 108*a*, other than investor 106*a*. For example, this may occur when an investor 106*a* for a loan is not designated prior to closing. Originator 101*a* may notify one or more of the electronic clearing house 102*a*, warehouse lender 105*a*, investor 106*a*, and electronic vault 107*a*, that a loan is ready for a sale on the mortgage marketplace 104*a*. The electronic clearing house 102*a* may send a marketplace request detailing limited loan data to the mortgage marketplace 104*a*. The mortgage marketplace 104*a* may send a notice for bid purchase to participating purchasers 108*a* (e.g., purchasing counterparties). Participating purchasers 108*a* may be designated in the marketplace request by the originator 101*a* or by a predefined relationship between the originator 101*a* and the purchasers 108*a* at the marketplace level.

Purchasers 108*a* interested in purchasing the loan may send a confirmation of purchase offer request to the mortgage marketplace 104*a* indicating a formal purchase offer, including purchase price and additional required purchase instructions. The mortgage marketplace 104*a* may send a purchase offer request to the clearing house 102*a* providing purchase counterparty information and loan purchase details. The clearing house 102*a* may send a purchase offer response to the originator 101*a* providing purchase counterparty information and loan purchase details.

The originator 101*a* may accept a purchase offer by sending a purchase confirmation to the electronic clearing house 102*a*. The electronic clearing house 102*a* may send the confirmation to the mortgage marketplace 104*a*. The mortgage marketplace 104*a* may send a purchase confirmation to the purchaser 108*a* of the loan. If additional purchase requests were received, the mortgage marketplace 104*a* may send purchase reject notifications to additional purchaser(s) 108*a* (e.g., notification that offers were not accepted). The mortgage marketplace 104*a* may send notification to warehouse lender 105*a*, investor 106*a*, and/or electronic vault 107*a*, indicating the purchaser of the loan.

Figure 2:
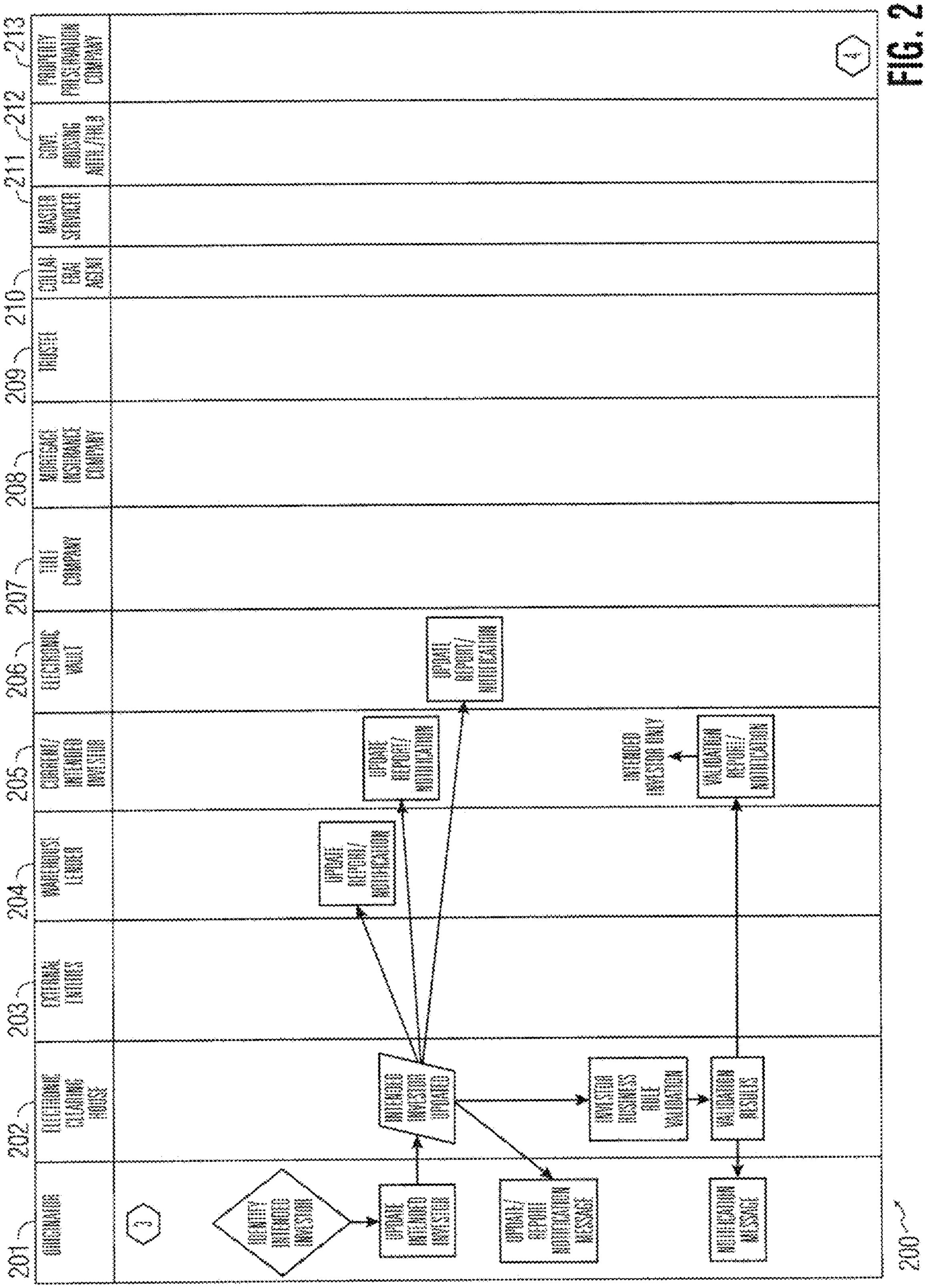
FIG. 2 is a flow diagram illustrating a data management system and method configured for performing investor update processes, according to an exemplary embodiment of the present disclosure.

Turning now to FIG. 2, FIG. 2 is a flow diagram illustrating a data management system and method 200 for performing investor update processes, according to an exemplary embodiment of the present disclosure. When the originator 201 selects an end investor 205 who has agreed to purchase the mortgage, it may add this data point to the automated stream that is drawn out of the loan origination system and/or warehouse to ensure the loan data is routed correctly. The clearing house 202 may notify the intended investor 205 of the current status of the loan by referencing a standard time-line to completion or color-coded status, such as red, green or yellow to indicate whether a loan application is proceeding, pending, or approved to advance, respectively. Once the investor 205 is identified, the clearing house 202 may select a set of business rules associated with that specific investor 205 and test the data it has received to date in the process to ensure it matches investor 205's requirements and parameters. In the event, the rules indicate the data does not match the investor 205's requirements and parameters, the clearing house 202 may notify the investor 205 of the discrepancies so they can be resolved between the loan originator 201 and the investor 205.

Figure 3:
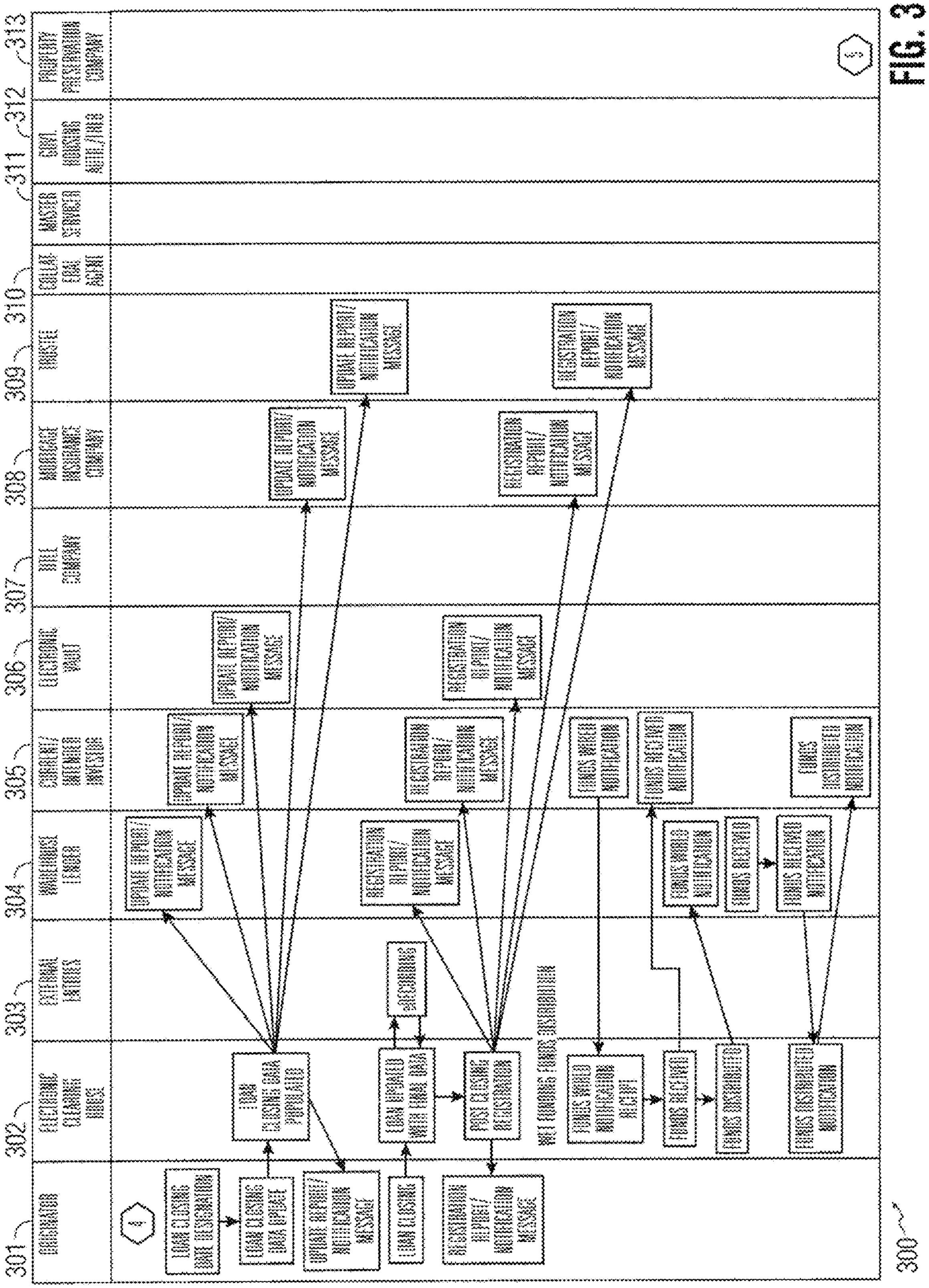
FIG. 3 is a flow diagram illustrating a data management system and method configured for performing asset note closing, post-closing registration and settlement processes, according to an exemplary embodiment of the present disclosure.

Turning now to FIG. 3, FIG. 3 is a flow diagram illustrating a data management system and method 300 for performing asset note closing and registration processes, according to an exemplary embodiment of the present disclosure. Originator 301 may notify one or more of the clearing house 302, warehouse lender 304, the investor 305, electronic vault 306, and associated members 308-313 that a loan has been approved for underwriting and a possible closing date has been selected for the loan. Investor 305 and warehouse lender 304 may respond and affirm that they have received a message related to the closing date.

The borrower and the originator 301 may proceed to a loan closing which can occur in person or through a virtual, online closing systems and/or networks that optionally uses a personal and/or portable computer (e.g., tablet) to present a borrower with the final closing loan package, which is represented by the electronic loan file and note and all the required disclosures that may be required by local, state, and federal regulations. The borrower may optimally sign the required documents through an e-signature process that relies on a unique tamper evident digital signature for that individual borrower's legal acceptance of the terms and conditions of the loan agreements.

Once the loan closing is complete, disclosures are made, and electronic documents are executed by the borrower, the originator 301 may send, via a network, an API, related web service, or other suitable (electronic) means, an electronic loan file and note to the clearing house 302, which processes the post-closing registration. Originator 301 may notify one or more of the clearing house 302, warehouse lender 304, investor 305, electronic vault 306, and associated members 308-313 that the closing and registration has occurred. At the same time, the clearing house 302 may initiate a message that includes a data string describing the loan to third party vendor system(s) or network(s) to submit loan and note data into the public records at the appropriate political subdivision. The clearing house 302 may receive a message back from the firm, system or public records office acknowledging the file was accepted into the public records database using an electronic notarization and electronic recording process. The confirmation that this process has occurred may become part of the electronic loan file and available to the originator 301, investor 305 and/or warehouse lender 304.

Figure 4:
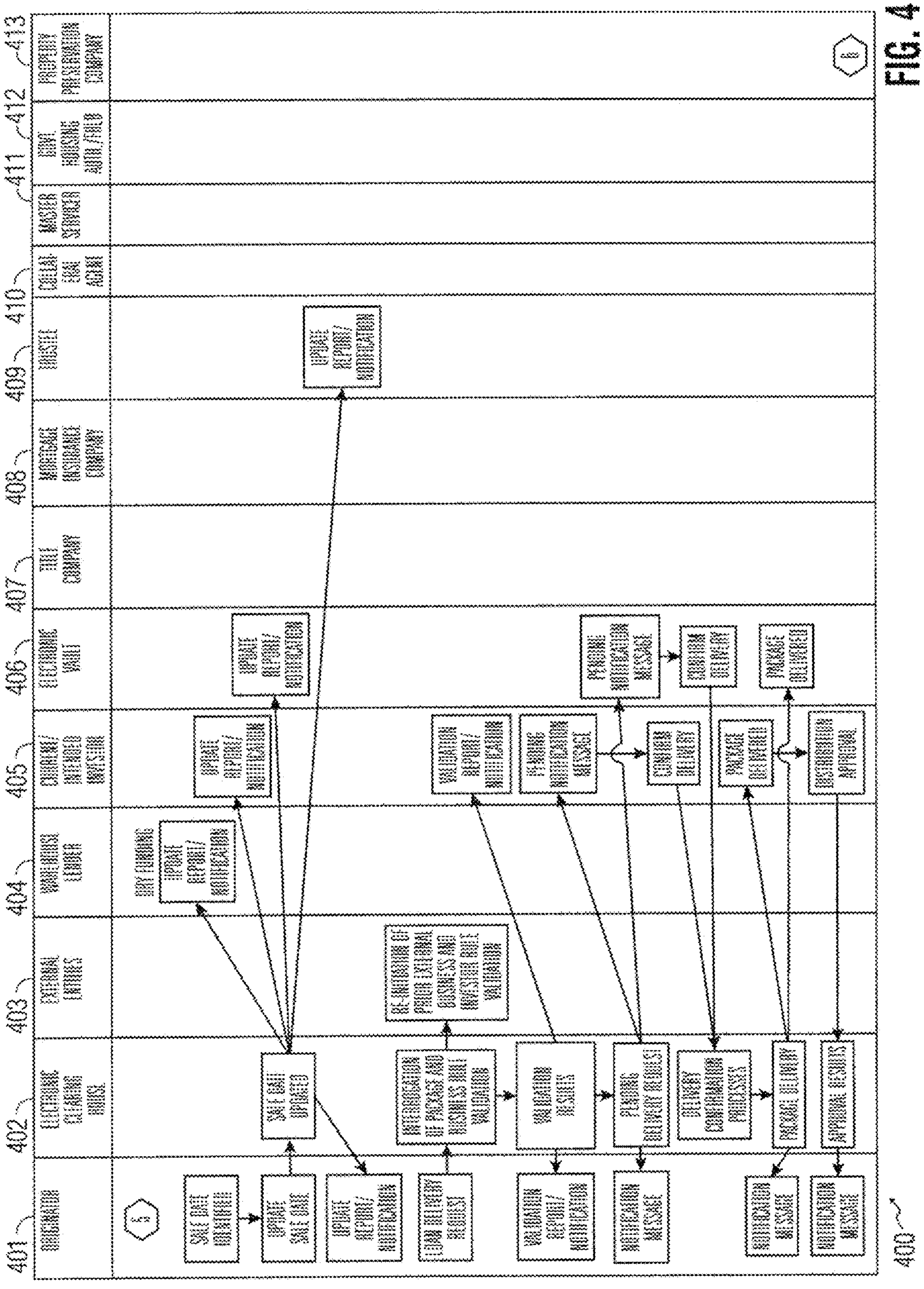
FIG. 4 is a flow diagram illustrating a data management system and method configured for performing asset sale date notification and delivery to an aggregator processes, according to an exemplary embodiment of the present disclosure.
Figure 6:
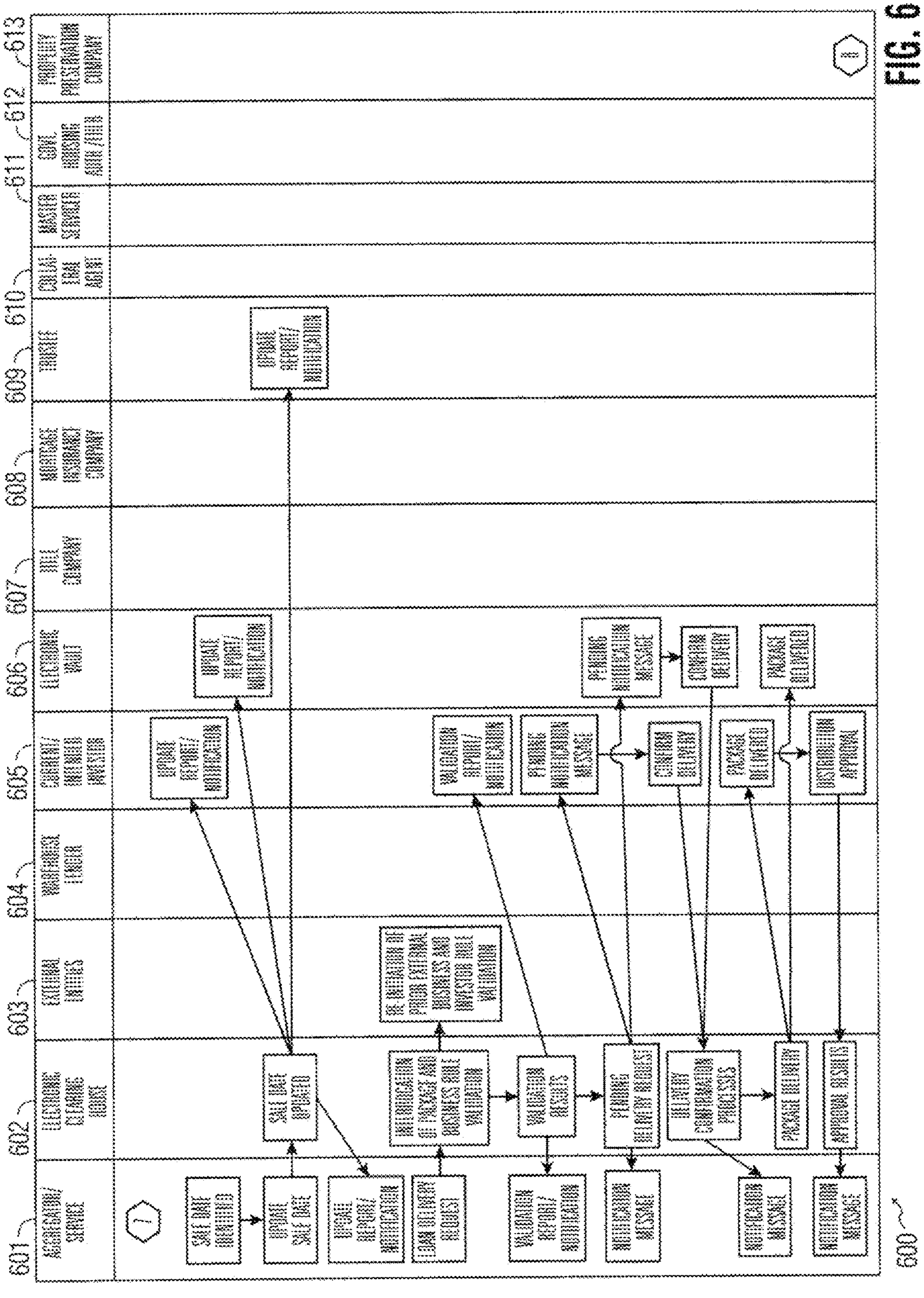
FIG. 6 is a flow diagram illustrating a data management system and method configured for performing asset sale date notification and delivery to an investor processes, according to an exemplary embodiment of the present disclosure.

Turning now to FIGS. 4 and 6, FIGS. 4 and 6 are flow diagrams illustrating data management systems and methods 400/600 for performing asset sale date notification and delivery to an aggregator and/or agency investor processes, according to an exemplary embodiment of the present disclosure. Once the loan is registered and ready for sale on an aggregator or investor, the originator 401/601 may send, via a network, an API, related web service, or other suitable (electronic) means, a bundled electronic loan file and note to the electronic clearing house 402/602, which can run an automated, post-closing review to analyze and match the submitted values extracted from the loan file and note against business rules that confirm investor 405/605 requirements, parameters, and/or guidelines as well as compare data to data and values that may be necessary to satisfy compliance with local, state, and federal regulations.

During this process, the loan file and note may reside in the clearing house electronic vault 406/606. As the public recording acknowledgment and confirmation is being submitted and received, the clearing house 402/602 may complete the review and notify the investor 405/605, the warehouse lender 404/604, and/or the originator 401/601 whether the delivered note and loan file match their individual requirements, guidelines, and/or parameters. The review may provide a message back to the originator 401/601 (or the originator's agent) that characterizes the loan file and note as (without limitation):

i) Cleared—which may indicate that the loan file is ready for delivery to the end investor 405/605, and/or ready for release of the electronic note, which may be controlled by the warehouse lender 404/604. This message may come in the form of a message text or a color-coding that signifies the status of the note;

ii) Suspended—which may indicate that pre-determined parameters of the business rules were violated or did not match required investor guidelines adequately. In this case, the clearing house 402/602 may provide an error code, which describes the reasons for the failed delivery. The originator 401/601 may have an opportunity to cure any problems with the delivery for a fixed period of time. This message may come in the form of a message text or a color-coding that signifies the status of the note; and iii) Rejected—which may indicate that the originator 401/601 must resubmit the electronic note and loan file because the underlying loan dataset did not match the values expected by the clearing house 402/602, warehouse lender 404/604 and/or investor 405/605. This message may come in the form of a text message or a color-coding that signifies the status of the note.

If the loan file and note package is "cleared" as described above, the electronic documents may be delivered to a third-party vendor or directly to the investor 405/605 for cash settlement and for permanent storage in an electronic vault or electronic data custodian service 406/606. Components of the loan file and note as well as underlying data may be electronically delivered to third-party associated members 408-413/608-613, for example (without limitation) data custodians, document custodians, or loan servicers. The meta-data package(s) associated with the loan file and note may be updated with this lifecycle event that may include the location of the note, the loan file as well as the recordation steps executed by a third-party vendor (and/or any other information).

Figure 5:
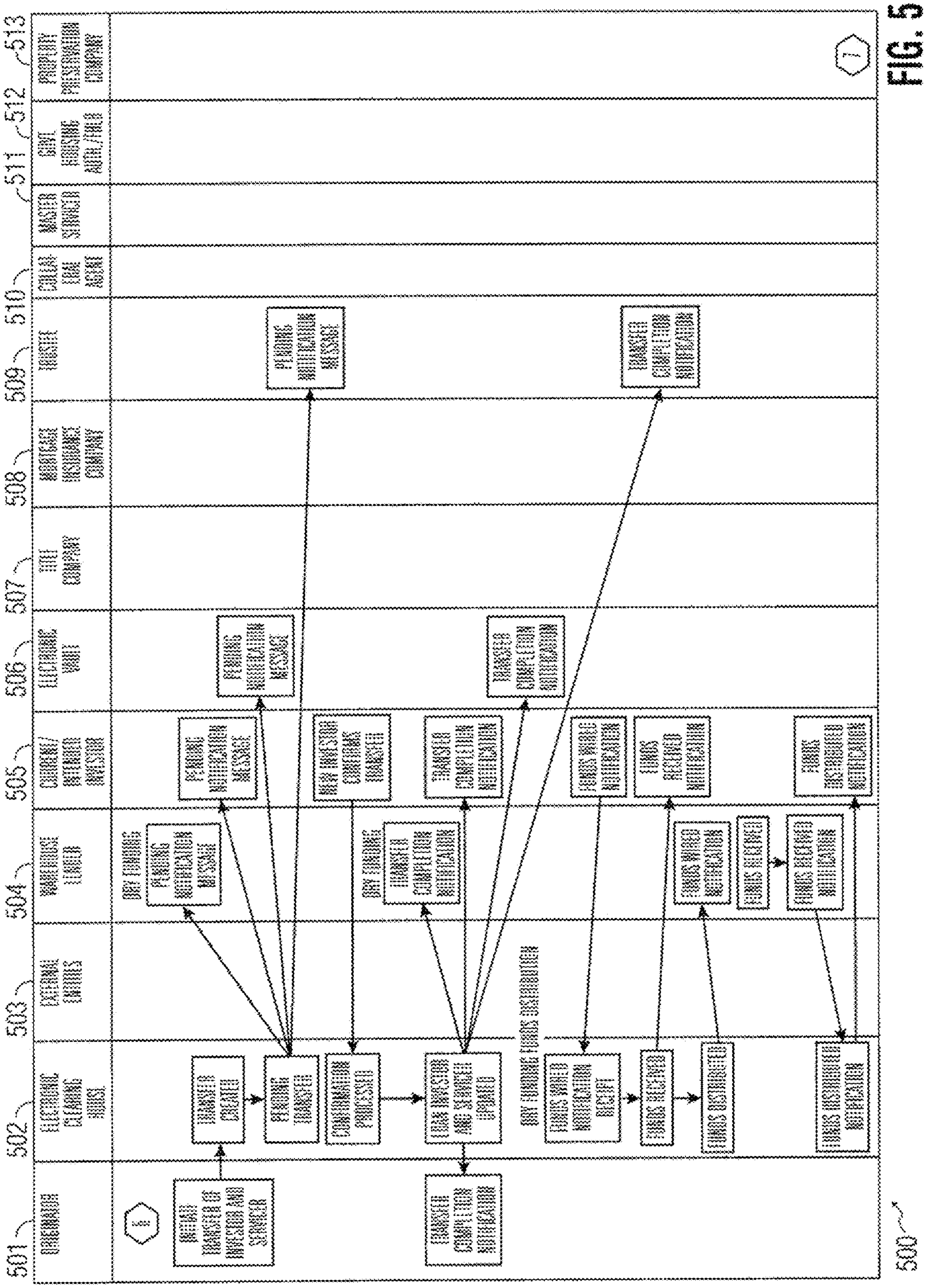
FIG. 5 is a flow diagram illustrating a data management system and method configured for performing transfer of asset investor and servicing to an aggregator processes, according to an exemplary embodiment of the present disclosure.

Turning now to FIG. 5, FIG. 5 is a flow diagram illustrating a data management system and method 500 for performing transfer of asset investor and servicing to aggregator processes, according to an exemplary embodiment of the present disclosure. If the note is under the control of the warehouse lender 504, the clearing house 502 may notify the warehouse lender 504 that the loan has cleared and direct the warehouse lender 504 to release control and assign control rights to the clearing house 502. In some instances, this process may be automated. Simultaneous with this release, the clearing house 502 may initiate a payment to the warehouse lender 504.

Figure 7:
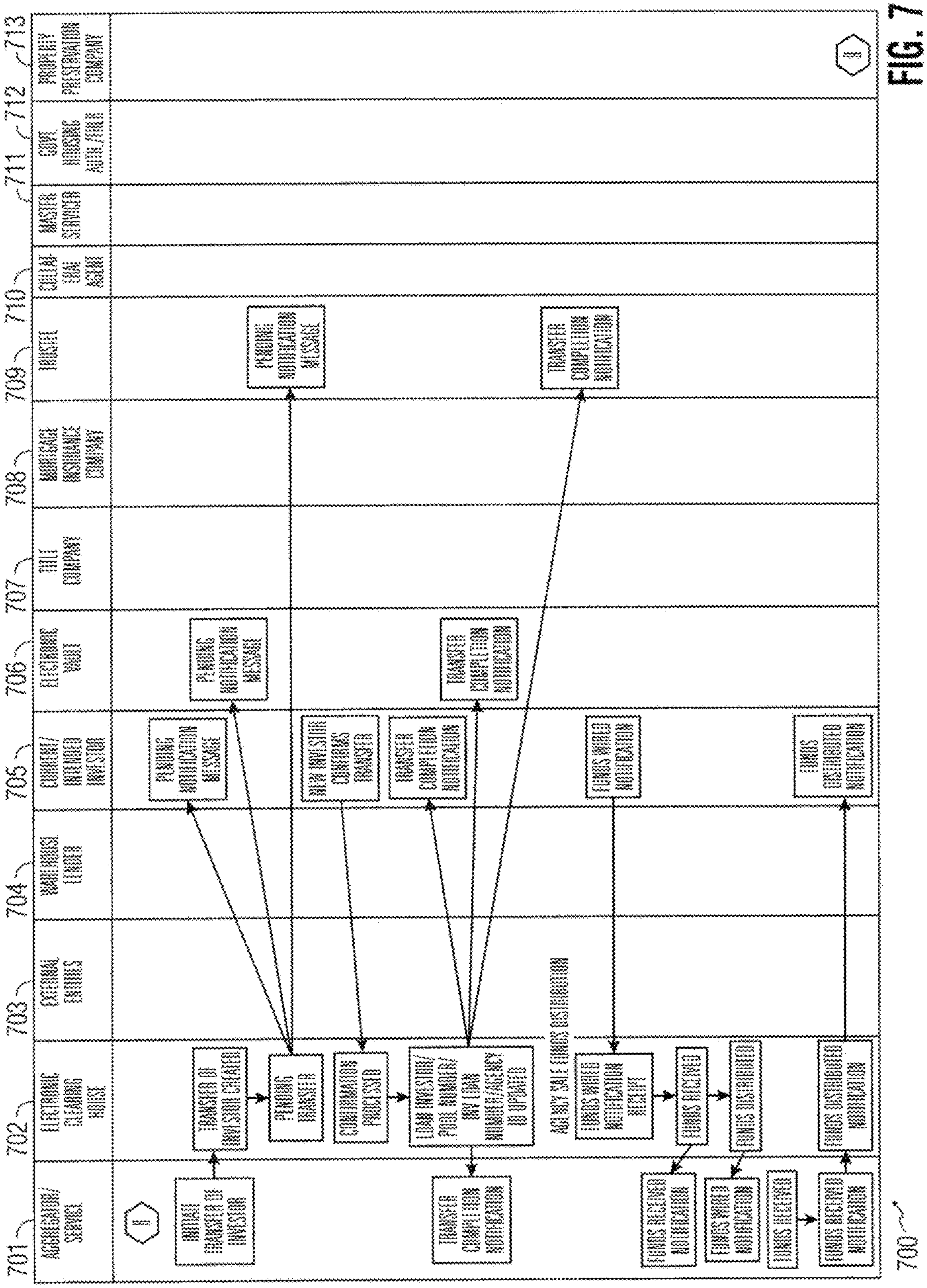
FIG. 7 is a flow diagram illustrating a data management system and method configured for performing transfer of asset investor to an agency processes, according to an exemplary embodiment of the present disclosure.

Turning now to FIG. 7, FIG. 7 is a flow diagram illustrating a data management system and method 700 for performing transfer of asset investor to an agency processes, according to an exemplary embodiment of the present disclosure. The clearing house 702 may transfer control rights to the investor 705 in exchange for a direct payment against the transfer of control of the asset in the clearing house registry. The clearing house 702 may reconcile the payments and initiate the transfer of beneficial ownership to the investor 705. Then, the clearing house 702 may update the electronic registry records to reflect the changes in control and to report to the registry the meta-data of the package as it changed throughout the process.

Figure 8:
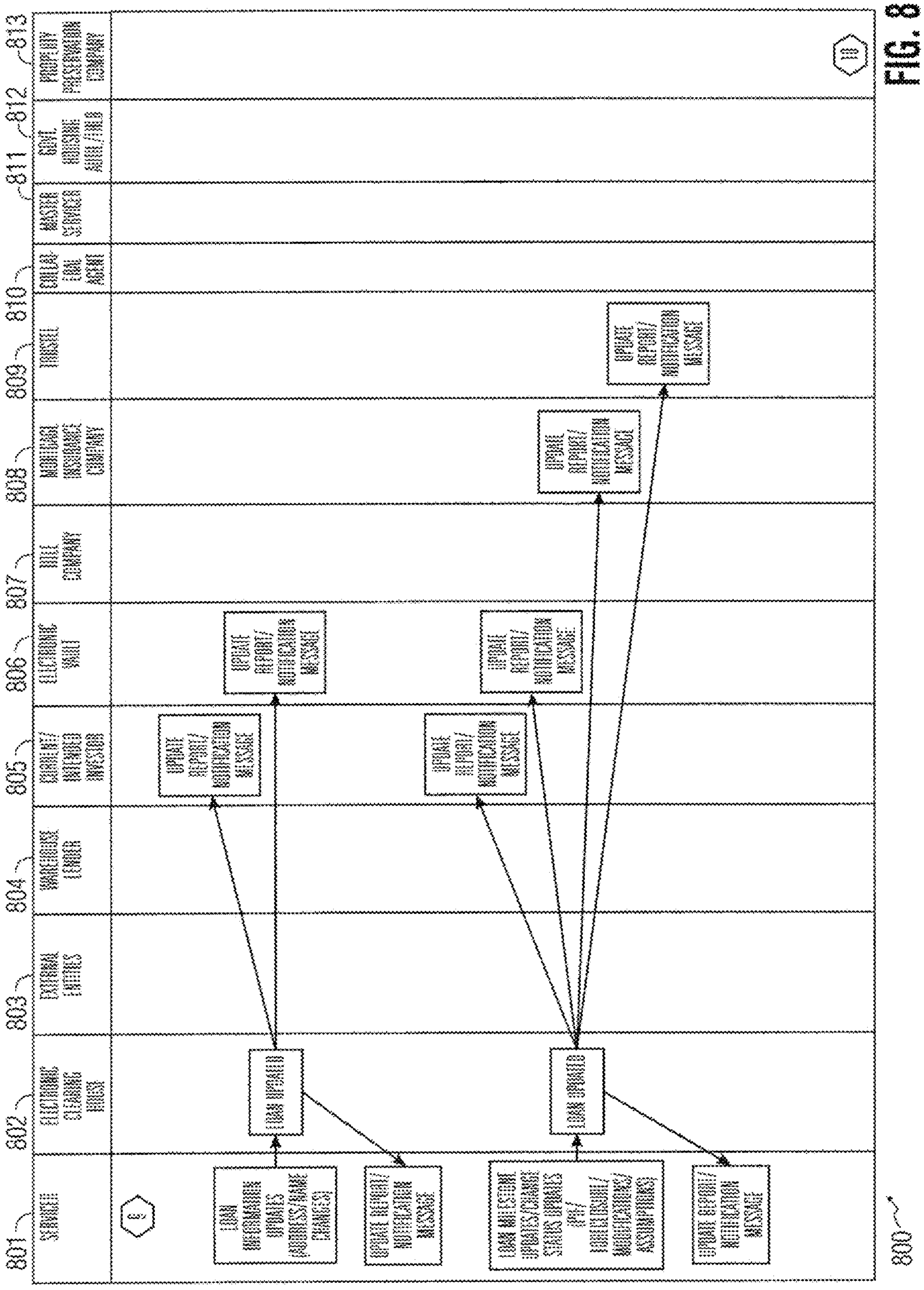
FIG. 8 is a flow diagram illustrating a data management system and method configured for performing update notification processes, according to an exemplary embodiment of the present disclosure.

Turning now to FIG. 8, FIG. 8 is a flow diagram illustrating a data management system and method 800 for performing update notification processes, according to an exemplary embodiment of the present disclosure. Once the loan file and note have been delivered by the clearing house 802 to associated members 808-813 based on investor 805 instructions, the clearing house 802 may continue to receive messages and reports about the status of the loan's performance, payments made, life of loan events, as well as any changes that are associated with the beneficial owner and loan servicer, default of the borrower.

These activities may be collected and tracked within the registry maintained by the clearing house 802. The clearing house 802 may use its unique identifier and its electronic network connections with servicing systems to receive the messages, and will categorize messages into pre-defined categories known as lifecycle events. The lifecycle events may be gathered and aggregated for periodic reports to investors who want to know current location of loan collateral, where electronic copies and/or images of data files are located, and whether any of these changes during the loan's lifecycle.

In addition to accepting messages and reporting, the clearing house 802 may also serve as data transmission network where originators 801, investors 805, and associated members 808-813 may gather data files and send them as secure, encrypted electronic packages, individually or in bulk, referencing the unique identifiers. The clearing house 802 will serve as a dedicated, secure neutral data exchange network for transmitting data between counterparties based on certain standards and agreed-upon protocols for packaging and delivering data and information. To exchange files between parties, the clearing house 802 may use its unique identifier as well as its organization ID to identify and track loan files and their recipients.

When a loan file or note is transmitted through the network, the clearing house 802 may review the meta-data embedded in the files to determine its contents, source, destination, and recipient and to ensure routing instructions are accurate. The data may also identify who has permission to receive and review the contents of the loan files and note, and it may only be accessible to the recipient identified by the sender. In some instances, the clearing house 802 may exchange payments between counterparties that may choose to combine the data delivered across the network with the delivery of payments used to buy or sell loan assets.

Whereas many alterations and modifications of the present disclosure will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite only those features regarded as the disclosure.

The invention claimed is:

1. A system for data validation and management comprising:

one or more computer devices comprising a processor configured to execute computer-readable instructions that, when executed, cause the processor to:

receive, by a processing mechanism, asset data having a plurality of data formats from one or more data sources through a wired or wireless network, the asset data relating to one or more assets and comprising:

an electronic asset file, an electronic note configured to be signed via at least one digital signature, and a meta-data package describing contents of the electronic asset file and the electronic note;

store, by the processing mechanism, the asset data in a database;

determine, by a validation sub-system, based on an analysis of the meta-data package, that contents of one or more of the electronic asset file and the electronic note do not meet delivery standards and eligibility requirements of a clearing house;

automatically normalize, by the validation sub-system, the asset data to generate normalized asset data comprising a single uniform format that meets the delivery standards and the eligibility requirements of the clearing house through at least one of a translation, a transformation, and a conversion of contents of the asset data;

generate, by the validation sub-system, an electronic message with an indication that the normalized asset data meets the delivery standards and the eligibility requirements of the clearing house;

transmit, by the validation sub-system, through the wired or wireless network, the electronic message to the one or more data sources;

update, by the validation sub-system, the meta-data package to include the indication that the normalized asset data meets the delivery standards and the eligibility requirements of the clearing house;

extract, by the validation sub-system, one or more values from the normalized asset data;

automatically validate, by the validation sub-system, the one or more values by comparing the one or more values to one or more requirements of normalized compliance data comprising the single uniform format;

transmit, by the validation sub-system, a confirmation to the processing mechanism when the one or more values match the one or more requirements of the normalized compliance data; and initiate, by the processing mechanism upon receiving the confirmation from the validation sub-system, an asset transaction comprising the one or more values.

2. The system of claim 1, wherein the computer-readable instructions, when executed, further cause the processor to:

receive, by the processing mechanism, compliance data from a data management system or other party through the wired or wireless network, the compliance data comprising one or more data formats.

3. The system of claim 2, wherein the computer-readable instructions, when executed, further cause the processor to:

store, by the processing mechanism, the compliance data in the database.

4. The system of claim 2, wherein the computer-readable instructions, when executed, further cause the processor to:

automatically normalize, by the validation sub-system, the compliance data comprising the one or more data formats to form the normalized compliance data through at least one of a translation, a transformation, and a conversion of the compliance data comprising the one or more data formats.

5. The system of claim 1, wherein the single uniform format is an extensible mark-up language (XML) comprising one or more asset values that describe underlying characteristics of the one or more assets.

6. The system of claim 1, wherein the computer-readable instructions, when executed, further cause the processor to:

assign one or more unique asset identifiers to the asset data received from one or more sources; and assign one or more unique party identifiers to the one or more data sources communicating with a data management system.

7. The system of claim 1, wherein the one or more requirements comprise one or more of proprietary, third party and public records databases, proprietary business rules, and counter party and product grading systems.

8. The system of claim 1, wherein the asset transaction comprises one or more of a transfer of ownership of the one or more assets between counterparties, a transfer of the one or more assets themselves between counterparties, and a transfer of funds between counterparties.

9. The system of claim 1, wherein the computer-readable instructions, when executed, further cause the processor to:

validate the at least one digital signature.

10. The system of claim 1, wherein the computer-readable instructions, when executed, further cause the processor to:

store the received asset data in an electronic vault of a data management system, wherein the received asset data associated with one particular asset of the one or more assets is stored as an individual data record separate from other individual data records.

11. The system of claim 1, wherein the computer-readable instructions, when executed, further cause the processor to:

receive and store data records of asset lifecycle events and historical audit records of the asset transaction, wherein the asset lifecycle events comprise one or more events that affect characterization of the asset data; and update asset records on a continual basis as lifecycle events occur that affect the asset data characterization.

12. The system of claim 1, wherein the electronic note comprises a legal instrument representing ownership rights associated with the one or more assets.

13. The system of claim 1, wherein the at least one digital signature is configured to be tamper evident.

* * * * *